Dec. 28, 1937.                L. C. HAMMOND                2,103,528
                              TOOL SETTING GAUGE
                            Filed March 23, 1937

Lee C. Hammond, INVENTOR.

BY

Barnwell R. King, ATTORNEY.

Patented Dec. 28, 1937

2,103,528

UNITED STATES PATENT OFFICE 2,103,528

TOOL SETTING GAUGE

Lee C. Hammond, Kalamazoo, Mich., assignor to Hammond Machinery Builders, Inc., Kalamazoo, Mich., a corporation of Michigan Application March 23, 1937, Serial No. 132,588

6 Claims. (Cl. 29—69)

This invention relates to tool setting gauges, and more particularly to gauges for setting the tools of printers' sawing and trimming machines.

The main objects of my invention are:

First, to provide a tool setting gauge that is simple and accurate, and easy to use.

Second, to provide a tool setting gauge that is serviceable and very efficient and effective in operation.

I attain these objects by the device illustrated in the accompanying drawing, in which.

Figure 1:
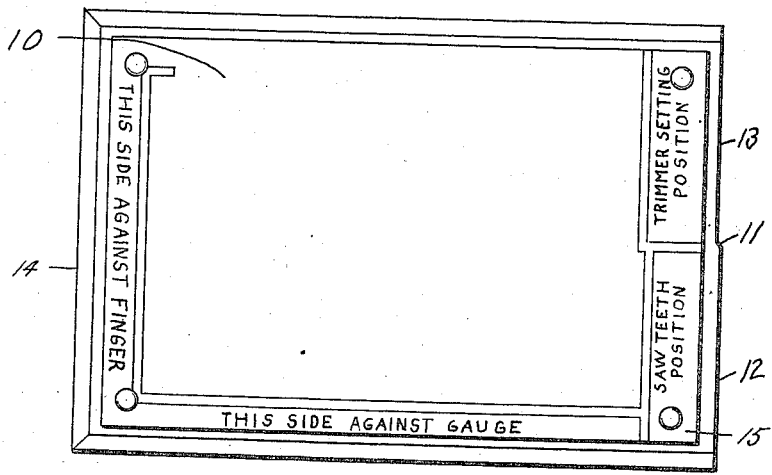
Fig. 1 is a top plan view of my tool setting gauge.
Figure 2:
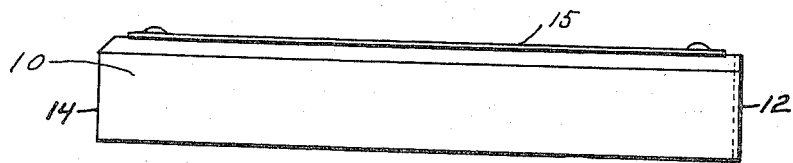
Fig. 2 is a view in side elevation of the gauge.
Figure 3:
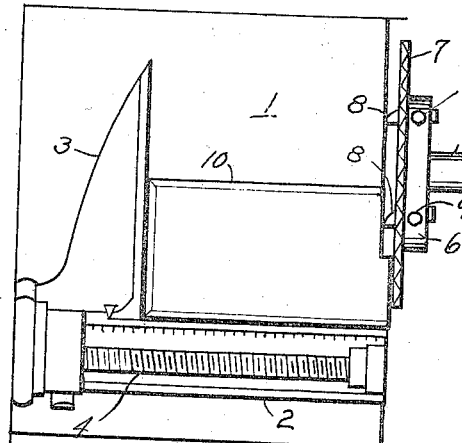
Fig. 3 is a fragmentary top plan view of a printers' sawing and trimming machine with my gauge in place for use.
Figure 4:
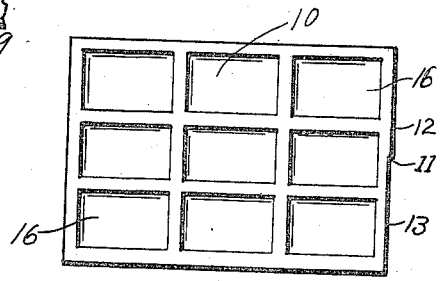
Fig. 4 is a bottom plan view of the gauge.

Referring to the drawing, 1 is the work table of a printers' sawing and trimming machine, there being fixed on said table a work gauge 2 having a work finger 3 mounted thereon for longitudinal adjustment through a micrometer screw 4. The work table is adapted to be moved past a tool arbor 5 having a head 6 on the face of which is secured a disk saw 7. The saw is provided with holes for the passage of trimmer tools 8 which are held in adjusted position by set screws 9. In operation the work to be sawed and trimmed is placed on the table in the angle between the finger and work gauge, and the table and work are moved as a unit past the saw and trimmer in a manner well known to those familiar with machines of this type.

For properly setting the tools relative to each other, I provide a gauge 10 in the form of a rectangular block having a stepped face 11 providing a saw contact area 12 and a trimmer tool contact area 13. The length of the gauge is preferably slightly over thirty picas between the opposite face 14 and the saw contact area 12, and thirty picas between the face 14 and the trimmer tool contact area 13.

A top plate 15 is mounted on the tool setting gauge with printed directions for its use thereon. The gauge is preferably formed of metal and has downwardly opening recesses 16 therein to facilitate the disposition of the bottom of the block directly on the table.

The work finger 3 is first set at the thirty-one pica mark on the work gauge 2, the table 1 being first cleaned of all dirt. The tool setting gauge 10 is then placed in position on the table in the angle between the finger 3 and work gauge 2, with the stepped face 11 of the block adjacent the tool arbor 5 of the sawing and trimming machine. The micrometer screw 4 is turned to cause the finger 3 to move the gauge 10 until the side of the saw teeth just touch the contact area 12 when the saw is slowly rotated by hand. Each trimmer tool 8 is then moved up until it touches the contact area 13 of the face 11, and its set screw 9 is tightened. The micrometer dial on the work gauge is finally adjusted to zero with the pointer on the finger at the thirty pica mark on the work gauge 2.

From the foregoing description of my invention it will be apparent to those skilled in the art that I provide quick and accurate means for setting the cutting tools of a sawing and trimming machine. The device is simple and easy to use and is very efficient and effective for the purpose intended.

I claim:

1. A tool setting gauge for printers' sawing and trimming machines of the type having a work table on which is mounted a work gauge provided with a work finger, said tool setting gauge comprising a rectangular block having downwardly opening recesses therein, one face of said block being stepped for coaction with the trimming tools and saw teeth, respectively, of the machine, said block being adapted to be disposed on the work table in the angle between the work gauge and finger with said stepped face adjacent the tools to be set.

2. A tool setting gauge for printers' sawing and trimming machines of the type having a work table on which is mounted a work gauge provided with a work finger, said tool setting gauge comprising a block, one face of said block being stepped for coaction with the trimming tools and saw teeth, respectively, of the machine, said block being adapted to be disposed on the work table in the angle between the work gauge and finger with said stepped face adjacent the tools to be set.

3. A tool setting gauge for printers' sawing and trimming machines of the type having a work table on which is mounted a work gauge provided with a work finger, said tool setting gauge comprising a block, one face of said block having contact areas for coaction with the trimming tools and saw teeth, respectively, of the machine, said block being adapted to be disposed on the work table in the angle between the work gauge and finger with said stepped face adjacent the tools to be set.

4. In a printers' sawing and trimming machine, the combination with a tool arbor carrying relatively adjustable sawing and planing tools, and a work table provided with a work gauge having a work finger, of a rectangular block adapted to be disposed on said work table in the angle between said gauge and finger, the face of said block next to said tool arbor being stepped to provide fixed gauge means for setting said sawing and planing tools in proper work cutting position relative to each other.

5. In a printers' sawing and trimming machine, the combination with a tool arbor carrying relatively adjustable sawing and planing tools, and a work table provided with a work gauge having a work finger, of a tool setting gauge adapted to be disposed on said work table in the angle between said gauge and finger, said tool setting gauge having contact areas for setting said sawing and planing tools in proper work cutting position.

6. For a printers' sawing and trimming machine comprising a tool arbor carrying relatively adjustable sawing and planing tools, and a work table provided with a work gauge having a work finger, a tool setting gauge adapted to be disposed on said work table in the angle between said gauge and finger.

LEE C. HAMMOND.